(12) United States Patent
Fujita et al.

(10) Patent No.: US 7,630,151 B2
(45) Date of Patent: Dec. 8, 2009

(54) LENS DRIVE UNIT

(75) Inventors: Yuji Fujita, Nagano (JP); Noboru Otsuki, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 91 days.

(21) Appl. No.: 10/585,530

(22) PCT Filed: Jan. 5, 2005

(86) PCT No.: PCT/JP2005/000019

§ 371 (c)(1), (2), (4) Date: Aug. 7, 2007

(87) PCT Pub. No.: WO2005/066681

PCT Pub. Date: Jul. 21, 2005

(65) Prior Publication Data

US 2008/0285162 A1 Nov. 20, 2008

(51) Int. Cl.
*G02B 7/02* (2006.01)
(52) U.S. Cl. ......... 359/822; 359/823; 359/824
(58) Field of Classification Search ......... 359/694–700, 359/819–824; 396/87, 89, 133
See application file for complete search history.

(56) References Cited

U.S. PATENT DOCUMENTS 5,303,089 A * 4/1994 Ohno ............ 359/814
7,298,562 B2 * 11/2007 Sue et al. ............ 359/819

FOREIGN PATENT DOCUMENTS

| JP | 58-88611 | 6/1983 |
| JP | 2003-043334 | 2/2003 |
| JP | 2004-144795 | 5/2004 |
| JP | 2004-222064 | 8/2004 |
| JP | 2004-266340 | 9/2004 |

* cited by examiner

*Primary Examiner*—Mohammed Hasan
(74) *Attorney, Agent, or Firm*—Reed Smith LLP (57) ABSTRACT

In the lens drive unit; the position retaining parts are advanced by rotating the position retaining member, which is held in the case body in such a manner as to become rotatable, in the R direction so that the position retaining parts are positioned just under the protrusion parts of the movable lens body, and eventually the movable lens body can be retained at the middle position. Furthermore, the through-holes are advanced by rotating the position retaining member in the R direction so that the through-holes are positioned just under the protrusion parts of the movable lens body, and eventually the protrusion parts loosely get fitted into the through-holes of the position retaining member to enable the body tube holder to move downward.

8 Claims, 10 Drawing Sheets

LENS DRIVE UNIT

CROSS-REFERENCE TO RELATED APPLICATIONS

This application claims priority of International Application No. PCT/JP2005/000019, filed Jan. 5, 2005 and Japanese Application No. 2004-002587, filed Jan. 8, 2004, the complete disclosures of which are hereby incorporated by reference.

BACKGROUND OF THE INVENTION a) Field of the Invention

The present invention relates to a lens drive unit that is used for a relatively compact-sized camera and so on, such as a camera of a camera-equipped cell-phone and so forth.

b) Description of the Related Art

When a cellular phone equipped with a camera is used, the camera user often takes a photo of the user's own face and/or any of other photographic subjects at a close distance while holding the cellular phone in a single hand. Therefore, quite a few of the shooting lens systems used in this type of camera are provided with a close-up shooting function. In the case of such a shooting lens system provided with the close-up shooting function, lens positions for normal-distance shooting and close-up shooting, i.e., macro shooting, are different from each other. Namely, the lens position for close-up shooting is slightly closer to the object of shooting for a certain distance than the lens position for normal-distance shooting.

For this reason, the shooting lens system of this type is equipped with a drive unit for moving the lens between the position for normal-distance shooting and the position for macro shooting. The drive unit is operated by changing the switch status to move the lens between the two positions described above. However, for a mobile device such as a cellular phone and so on, it is difficult to use a motor as the drive unit because of compact design and weight saving of the mobile device.

Therefore, conventionally it is proposed to use a lens drive unit of a magnetic drive type, which includes: a cylindrical lens holder to support the lens; a ring-shaped magnet placed around the outer circumference of the lens holder; and a drive coil facing to the magnet; wherein the lens holder supporting the lens is directly moved in an optical axis direction, not via any transmission mechanism, by controlling an energizing operation for the drive coil, and then the lens holder is magnetically retained there. (Refer to Patent Document 1: Japanese Unexamined Patent Publication (Kokai) No. 10-150759).

SUMMARY AND OBJECT OF THE INVENTION a) Problem to be Solved

However, when a lens drive unit according to Patent Document 1 is built in a camera, shooting an image can be done only at two positions. As a result, the lens drive unit comes to have a restricted function and so as to have less flexibility. Furthermore, since the lens holder is magnetically retained at the retaining position by energizing the drive coil, the lens holder is likely to tilt in relation to the optical axis due to the clearance between the lens holder supporting the lens and a sliding section holding the lens holder. Consequently there exists a problem that, when shooting an image is carried out while the lens holder being retained at the retaining position, a quality level of the obtained image gets deteriorated.

In view of the problem described above, an object of the present invention is to provide a lens drive unit, with which the image shooting function can be expanded, and in which the lens does not tilt at the retaining position in relation to the optical axis.

b) Solution to the Problem in Accordance with the Invention

To solve the problem identified above, in the present invention, a lens drive unit includes: a movable lens body equipped with a lens; a drive means to move the movable lens body in an optical axis direction of the lens; a fixing body to support the movable lens body in such a manner to enable the movable lens body to move in the optical axis direction; and retaining a position of the movable lens body at both ends of an entire motion range in the optical axis direction; wherein the movable lens body is equipped with a first magnetic means as the drive means; the fixing body is equipped with a second magnetic means as the drive means which is placed so as to enable the movable lens body to move by one of magnetic attraction force and magnetic repulsion force caused between the first magnetic means and the second magnetic means; and furthermore, the fixing body is equipped with a position retaining member to retain the movable lens body at a middle position of the entire motion range in the optical axis direction while a touching section for touching at the movable lens body is touching at the movable lens body; and one of the position retaining member and the movable lens body relatively moves so as to move the touching section for having the touching section touch at the movable lens body to retain the movable lens body at the middle position so that the number of retaining positions of the movable lens body increase from both the two ends of the entire motion range.

In the present invention, it is preferable that one of the position retaining member and the movable lens body rotates relatively by using the optical axis as a rotating center so as to move the touching section for having the touching section touch at the movable lens body to retain the movable lens body at the middle position. According to the structure in this way, advancing movement of the touching section can be implemented by relative rotating motion of one of the position retaining member and the movable lens body while using the optical axis as a rotating center. Therefore, it is easily materialized to make the camera design downsized in comparison with a method of advancing movement where the touching section directly advances in the optical axis direction or a direction intersecting the optical axis.

Furthermore, in the present invention, it is preferable that the touching section is formed in a plural number in a circumferential direction so as to touch at and hold the movable lens body with multiple points in the circumferential direction. According to the structure in this way, it is possible to surely prevent the movable lens body from tilting in relation to the optical axis of the lens and to hold the movable lens body stably. On this occasion, it is preferable that three or more touching sections are formed.

Moreover, in the present invention, it is preferable that the first magnetic means is materialized by one of a drive magnet and a drive coil; the second magnetic means is materialized by the other side elements of a couple of drive magnets and a couple of drive coils which are placed separately at both sides of the first magnetic means in the optical axis direction; the middle position is materialized under a positioning condition in which the first magnetic means is in proximity to the second magnetic means; and at the middle position, the movable lens body is touched to the touching section under forced condition, by magnetic attraction force between the drive magnet and a back yoke of the drive coil. According to the structure in this way, the movable lens body can be retained at the touching section under forced condition. Therefore, the movable lens body does not get moved by physical impact, and it becomes possible to stabilize the image quality level. Furthermore, in the case of this invention, since the movable lens body is retained by magnetic attraction force between the drive magnet and the yoke, it becomes possible to save electric energy.

Moreover, in the present invention, it is preferable that the position retaining member is located at a side of an image pickup device. In the case of a camera for a camera-equipped cell-phone, there are three high needs; i.e., macro shooting that enables close-up shooting, and distant view shooting for shooting a distant view image, in addition to a need of shooting a user's own face. Among the lens positions of the three shooting operations described above, the position for shooting a user's own face and the position for shooting a distant view image are close to each other, and the position for macro shooting is far away from the position for shooting a user's own face. Therefore, the position for shooting a distant view image is implemented when the lens is located at a position close to the image pickup device. As a result, the position for shooting a user's own face; i.e., the middle position; is placed at a position close to the image pickup device. Consequently position retaining member is located at the position close to the image pickup device, and therefore the movable lens body can be retained at the touching section under forced condition, at the middle position among the three shooting positions described above.

Still further, in the present invention, it is preferable that the touching section retains the movable lens body at the middle position by touching at an end surface in the optical axis direction of the movable lens body. According to the structure in this way, the touching section is placed so as to face the end surface in the optical axis direction of the movable lens body so that the protrusion of the touching section toward the external section of the movable lens body can be controlled to get minimized, and therefore it becomes possible to downsize the camera in the direction perpendicular to the optical axis.

Moreover, in the present invention, it is preferable that the position retaining member gets moved so as to move the touching section for having the touching section touch at the movable lens body to retain the movable lens body at the middle position. According to the structure in this way, it becomes possible to move the touching section for having the touching section touch at the movable lens body without moving the movable lens body so as to prevent displacement of the optical axis of the lens.

Furthermore, it is preferable that the movable lens body gets moved so as to move the touching section for having the touching section touch at the movable lens body to retain the movable lens body at the middle position. According to the structure in this way, it becomes possible to configure a drive unit that moves the movable lens body so as to move the touching section for having the touching section touch at the movable lens body, while the drive unit also serves as a first magnetic means to move the movable lens body in the optical axis direction.

c) Advantageous Effect of the Invention

In a lens drive unit of the present invention, it becomes possible to increase the number of retaining positions of the movable lens body from both the two ends of the entire motion range, by retaining the movable lens body at the middle position of the entire motion range in the optical axis direction with a position retaining member. Furthermore, the movable lens body is retained at the middle position while being touched to the touching section of the position retaining member so that it is possible to surely prevent tilting in relation to the optical axis of the lens.

BRIEF DESCRIPTION OF THE DRAWINGS

In the drawings:

FIG. 4 includes drawings for explanation of position relationships between the lens body tube holder and the position retaining member and so on under the condition where the lens body tube holder is retained at a middle position in the lens drive unit relating to the preferred embodiment 1 of the present invention. The figures of (A) show positioning condition of macro shooting in which the protrusion parts formed at the bottom surface of the lens body tube holder are located away from the position retaining member; wherein the figure (a) and (b) are a perspective view in which the lens body tube holder and the position retaining member are viewed from an obliquely higher position, and a explanatory drawing illustrating the lens body tube holder and the area around the position retaining member, respectively. The figures of (B) show positioning condition of normal-distance shooting in which the protrusion parts formed at the bottom surface of the lens body tube holder touch at the position retaining parts of the position retaining member to retain the lens body tube holder at the middle position; wherein the figure (a) and (b) are a perspective view in which the lens body tube holder and the position retaining member are viewed from an obliquely higher position, and a explanatory drawing illustrating the lens body tube holder and the area around the position retaining member, respectively. Moreover, the figures of (C) show positioning condition of distant view shooting in which the protrusion parts formed at the bottom surface of the lens body tube holder are loosely fitted in the through-holes of the position retaining member and the top parts of the protrusion parts touch at an end section as one of the restriction parts; wherein the figure (a) and (b) are a perspective view in which the lens body tube holder and the position retaining member are viewed from an obliquely higher position, and a explanatory drawing illustrating the lens body tube holder and the area around the position retaining member, respectively.

DESCRIPTION OF THE PREFERRED EMBODIMENTS

Preferred embodiments of the present invention are described below with reference to the accompanying drawings. Each preferred embodiment describes a structure suitable for installation as a camera section of mobile equipment such as a cellular phone and so on, but the structure can also be installed in other types of mobile equipment such as a PDA device (Personal Digital Assistance) and so forth.

Preferred Embodiment 1 a) General Structure

Figure 1:
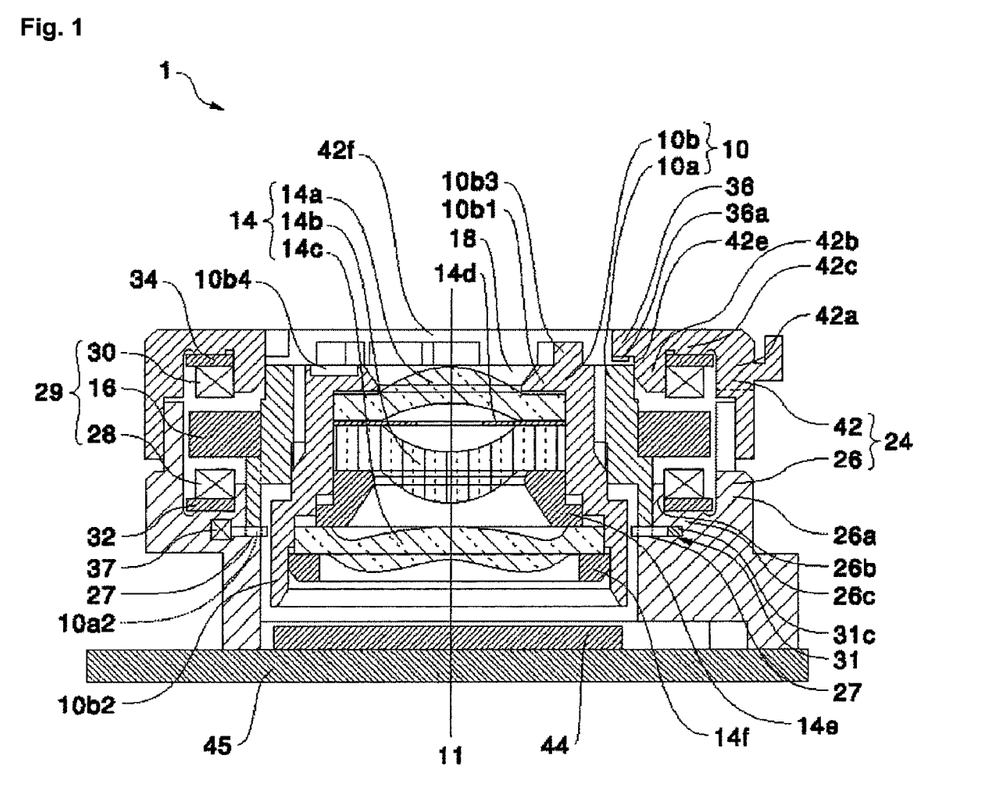
FIG. 1 is a cross sectional drawing to show a lens drive unit relating to the present invention.

FIG. 1 shows a cross sectional drawing of a lens drive unit relating to the present invention. Meanwhile, FIG. 2 is an exploded perspective view of the lens drive unit of FIG. 1.

Figure 2:
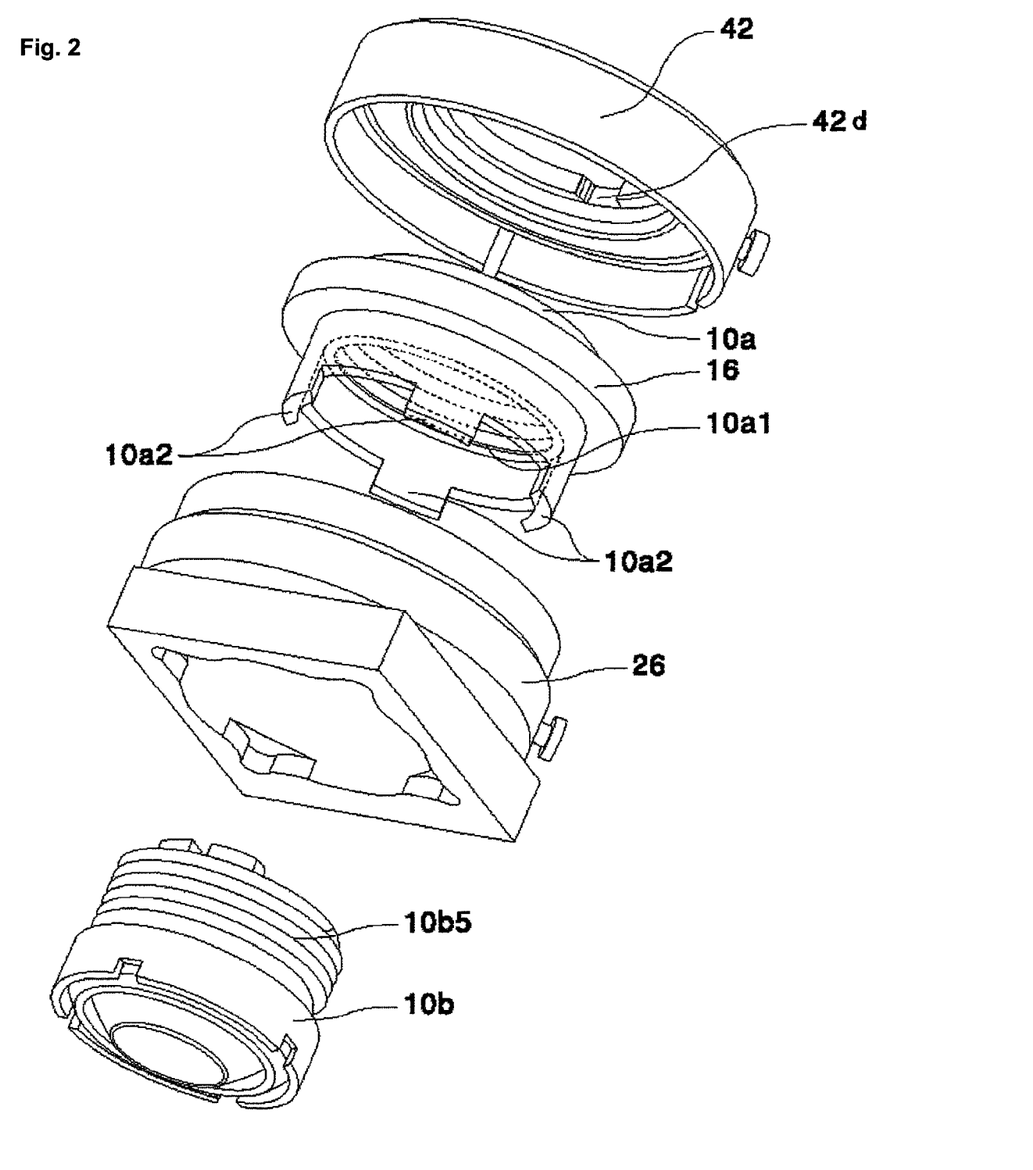
FIG. 2 is an exploded perspective view of the lens drive unit of FIG. 1.

As FIGS. 1 and 2 show, a lens drive unit 1 mainly includes: a movable lens body 10 to hold a shooting lens 14 of the camera, a magnetic drive means 29 to directly move the movable lens body 10 along an optical axis 11 of the lens 14, a case body 24 to support the movable lens body 10 in such a way that enables the movable lens body 10 to directly move along the optical axis 11 of the lens 14 and work as a fixing body for storing the movable lens body 10 and the magnetic drive means 29, an image pickup device 44 on which an image data coming through the lens 14 forms an image, and a circuit board 45 on which the image pickup device 44 is fixed. Incidentally, in the present embodiment, the image pickup device 44 is composed of CMOS (Complementary Metal Oxide Semiconductors).

The movable lens body 10 includes, a lens body tube 10b equipped with the lens 14 in it, and a lens body tube holder 10a that supports the lens body tube 10b in such a manner as to enable the lens body tube 10b to move in a direction of the optical axis 11. The lens body tube 10b has, at one of its end sections, a bottomed part 10b1 whose center section is equipped with a circular-shaped incident beam window 18 to introduce reflected light coming from an object into the lens 14, and the bottomed part 10b1 is located at the upper side in FIG. 1. At the upper side of the bottomed part 10b1 in the drawing; a connection protrusion 10b3 and a connection groove 10b4, formed for the purpose of turning the lens body tube 10b by using a prescribed jig, are placed to be convex and concave, respectively, in the direction of the optical axis 11. Furthermore, the upper section of the lens body tube 10b in FIG. 1 is formed with a smaller-diameter part, while the lower section is formed with a larger-diameter part having a diameter larger than that of the smaller-diameter part, and a male screw section 105b is formed on an outer wall of the smaller-diameter part (Refer to FIG. 2). The lens 14 consists of an objective side lens 14a, an intermediate lens 14b, and a camera-body side lens 14c in due order from the side of the bottomed part 10b1 of the lens body tube 10b, while a position fixing member 14f is fixed at an inlet part 10b2 of the lens body tube 10b so as to hold the lens 14 including three lenses. Incidentally, a clearance between the objective side lens 14a and the intermediate lens 14b is kept to be constant by a spacer 14d that also works as an aperture, and a clearance between the intermediate lens 14b and the camera-body side lens 14c is kept to be constant by a spacer 14e.

On the other hand, the lens body tube holder 10a is formed to be cylindrical, and its external circumference is formed in such a manner that its upper side section in FIG. 1 is a smaller-diameter part while its lower side section is a larger-diameter part having a diameter larger than that of the smaller-diameter part, and a step part is formed at a border part between the smaller-diameter and larger-diameter parts. Furthermore, on an inner wall of the lens body tube holder 10a, a female screw section 10a1 is formed (Refer to FIG. 2). The female screw section 10a1 screws together with a male screw section 10b5. That is to say, the lens body tube 10b is fitted in the lens body tube holder 10a so as to be enabled to rotate in it. Eventually, turning the lens body tube 10b makes it possible to move the lens body tube 10b with respect to the lens body tube holder 10a in the direction of the optical axis 11. In the meantime, the lens body tube holder 10a is provided with a turning-prevention part that is formed so as to be protruded from the top surface of the lens body tube holder 10a, though the turning-prevention part is not illustrated in the figure. Then, the turning-prevention part is engaged with a turning-prevention groove 42d placed in a second case split section 42, which is described later. As a result, this structure prevents the lens body tube holder 10a from rotating together when the lens body tube 10b rotates so that it become possible to move the lens body tube 10b efficiently. Furthermore, from the bottom surface of the lens body tube holder 10a, 4 protrusion parts 10a2 that protrude in the direction of the optical axis 11 are formed and they are placed at even intervals in the circumferential direction (Refer to FIG. 4).

Onto the smaller-diameter part of the lens body tube holder 10a; a drive magnet 16 formed into a ring shape, which acts as a first magnetic means, is fitted. Namely, the drive magnet 16 is fitted together onto the lens body tube holder 10a while being touched onto the step part described above. Then, in the drive magnet 16; one part surrounding a hole section at the center is magnetized with N-pole, meanwhile the other part of the entire outer circumferential section is magnetized with S-pole, and each of them is made up as a single pole magnet. Incidentally, in the relationships of the magnetized sections, the N-pole and S-pole parts may be replaced with each other.

The case body 24 is composed of a first case split section 26 and the second case split section 42. In this embodiment, the first case split section 26 is located at the lower side and the second case split section 42 is located at the upper side, as shown in FIG. 1. An external tube part 26a and another external tube part 42a each have a cylindrical protrusion part that protrudes in the direction of the optical axis 11, and both the cylindrical protrusion parts are assembled each other in the radial direction to unite the two case split sections into one body. Onto the first case split section 26 and the second case split section 42; a couple of a drive coil 28 and another drive coil 30, each of which is formed into a ring shape and acts as a second magnetic means, are fixed. Furthermore, the circuit board 45 is fixed at the bottom surface of the first case split section 26. Meanwhile, at an internal wall side of an upper section of the first case split section 26; a position retaining member 31, which is described later, is supported so as to become enabled to turn in an R direction while using the optical axis 11 as a turning center. In an external side of the radial direction of the position retaining member 31, a magnet 31c is fixed at a position in a circumferential direction. Furthermore, a drive coil 37, which is described later, is placed in a circumferential direction of the magnet 31c.

The first case split section 26 is formed to be cylindrical, and an internal tube part 26b is formed along a circumferential direction of the external tube part 26a at an internal side in the radial direction of the external tube part 26a. The external tube part 26a and the internal tube part 26b are connected with a connection part 26c, and eventually a U-groove part having its section U-shaped is formed with the external tube part 26a, the internal tube part 26b, and the connection part 26c. At an internal wall side of the internal tube part 26b; a step section is formed, and the step section becomes an end surface 27 that works as one of the restriction parts (an end section), which the 4 protrusion parts 10a2 protruding from the bottom surface of the body tube holder 10a touch at in the positioning condition of distant view shooting shown in FIG. 1.

The second case split section 42 is formed to be cylindrical, while having an opening part 42f at the upper side in FIG. 1. Furthermore, in the second case split section 42; an internal tube part 42b is formed extendedly along a circumferential direction of the external tube part 42a at an internal side in the radial direction of the external tube part 42a. The external tube part 42a and the internal tube part 42b are connected with a connection part 42c, and eventually a U-groove part is formed with the external tube part 42a, the internal tube part 42b, and the connection part 42c. In the internal tube part 42b, there is formed a protruded edge 36 that works as the other of the restriction parts (an end section), which an upper end surface of the body tube holder 10a touches at in the positioning condition of macro shooting that is implemented by moving the body tube holder 10a upward under the positioning condition of distant view shooting shown in FIG. 1. The protruded edge 36 is equipped with the turning-prevention groove 42d to be engaged with the turning-prevention part that is protruded from the top surface of the lens body tube holder 10a (Refer to FIG. 2). Furthermore, the protruded edge 36 is also equipped with a protrusion part 36a that protrudes downward in the direction of the optical axis 11. An internal wall side of the internal tube part 42b provides a sliding section 42e, which touches at an external wall of an upper section of the lens body tube holder 10a, to work as a guide part for the lens body tube holder 10a to move in the direction of the optical axis 11.

At the bottom sections of the U-grooves each formed in the first case split section 26 and the second case split section 42; a first magnetic piece 32 and a second magnetic piece 34 are fixed, respectively, while each of them being shaped like a ring. On the first magnetic piece 32 and the second magnetic piece 34; the first drive coil 28 and the second drive coil 30 are fixed so as to be stored inside the grooves, respectively, in such a manner that each inner side of both the coils contacts the internal tube part 26b and the internal tube part 42b, respectively. Then, the first drive coil 28 and the second drive coil 30 face each other in the direction of the optical axis 11. Meanwhile, in the structure along the direction of the optical axis 11, the first magnetic piece 32 and the second magnetic piece 34 are placed outside the first and second drive coils, respectively.

The movable lens body 10 is stored in the case body 24 in such a manner that the top and bottom surfaces, shown in the figure, of the drive magnet 16 placed on the lens body tube holder 10a are sandwiched between the first drive coil 28 and the second drive coil 30. In other words, the drive magnet 16 is laid out together with the first drive coil 28 and the second drive coil 30 in a stacking manner in the direction of the optical axis 11. As a result; when either or both of the first drive coil 28 and the second drive coil 30 is energized, the drive magnet 16 moves in the direction of the optical axis 11 so as to accordingly make the lens body tube holder 10a slide on the sliding section 42e and move the lens body tube holder itself in the direction of the optical axis 11. Incidentally, the bottom side of the body tube holder 10a touches at nowhere so as to be in free condition.

A facing distance between the first drive coil 28 and the second drive coil 30 is formed to be greater than the thickness of the drive magnet 16 in the direction of the optical axis 11 so that there exists a clearance between the drive magnet 16 and each of the first drive coil 28 and the second drive coil 30 in the direction of the optical axis 11. As a result, the drive magnet 16 is able to move within the range of the clearance so that the body tube holder 10a united with the drive magnet 16 is also able to move in the direction of the optical axis 11 for the distance of the clearance.

On the other hand, in the positioning condition of distant view shooting shown in FIG. 1; construction is made up in such a manner that the 4 protrusion parts 10a2 protruding from the bottom surface of the body tube holder 10a touch at the end surface 27 located inside the internal tube part 26b to make a little clearance between the first drive coil 28 and the drive magnet 16 so as not to cause any collision between the first drive coil 28 and the drive magnet 16. As a result, it becomes possible to prevent either of the first drive coil 28 and the drive magnet 16 from any damage.

In the same manner as described above, also in the positioning condition of macro shooting that is implemented by moving the body tube holder 10a upward under the positioning condition of normal-distance shooting shown in FIG. 1; construction is made up in such a manner that the upper end surface of the body tube holder 10a touches at the protruded edge 36 to make a little clearance between the second drive coil 30 and the drive magnet 16 so as not to cause any collision between the second drive coil 30 and the drive magnet 16. As a result, it becomes possible to prevent either of the second drive coil 30 and the drive magnet 16 from any damage. In the meantime, the turning-prevention groove 42d described above always becomes engaged with the turning-prevention part that is protruded from the top surface of the lens body tube holder 10a even though the lens body tube holder 10a moves between the positions of normal-distance shooting and macro shooting.

b) Structure of Position Retaining Mechanism

Figure 3A:
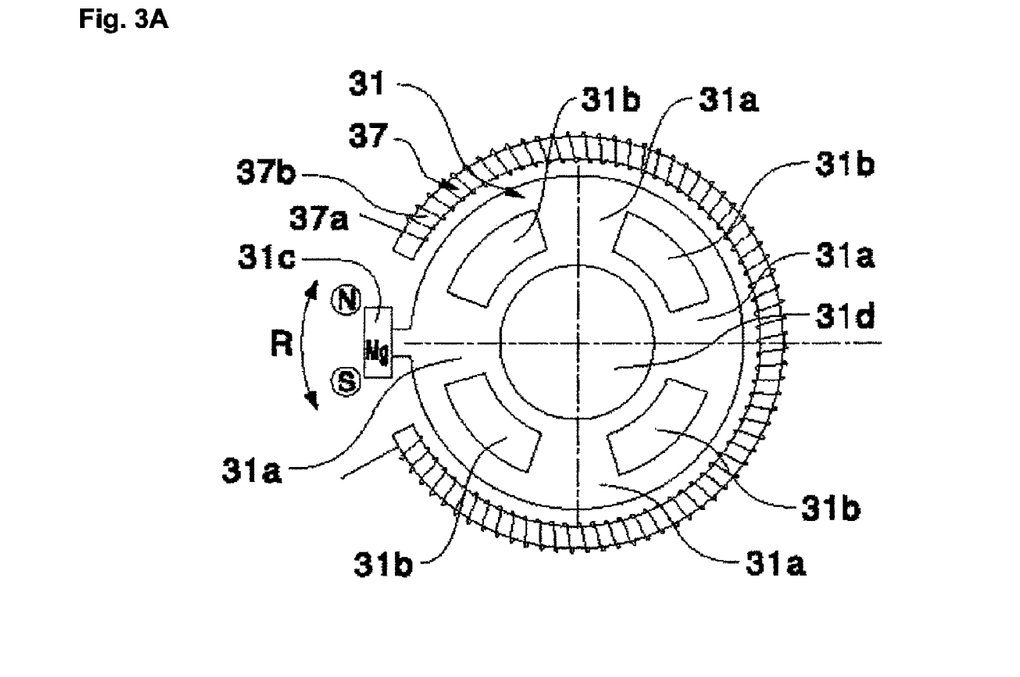
FIGS. 3A and 3B show a plan view illustrating the position retaining member and the drive coil to drive the position retaining member, which are used in the lens drive unit shown in FIG. 1, and a perspective view of the position retaining member, in which the position retaining member is viewed from an obliquely higher position, respectively.
Figure 3B:
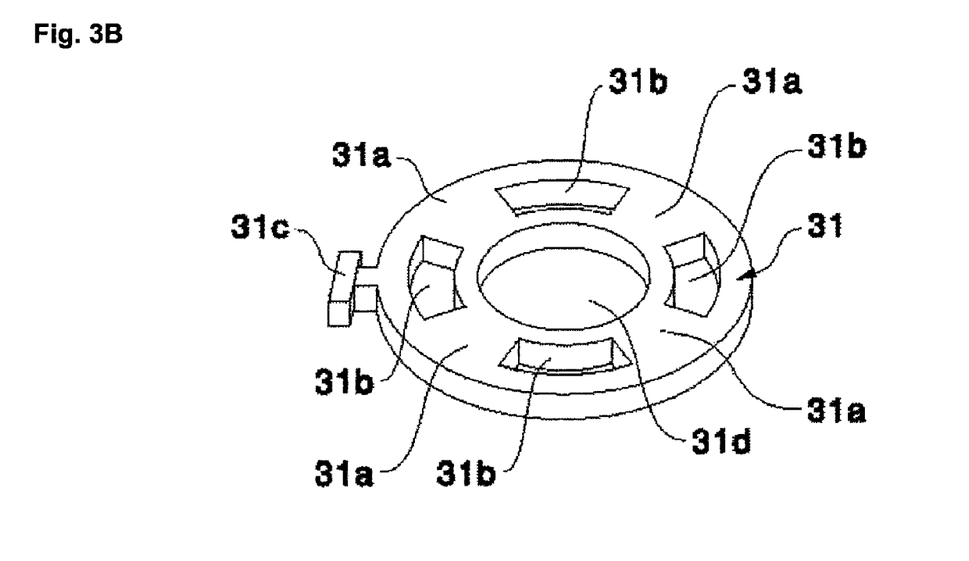

FIGS. 3A and 3B show a plan view illustrating the position retaining member and the drive coil to drive the position retaining member, which are used in the lens drive unit shown in FIG. 1, and a perspective view of the position retaining member, in which the position retaining member is viewed from an obliquely higher position, respectively.

As FIG. 3 shows, the position retaining member 31 is formed to be like a disc equipped with a center hole 31d, which loosely fits with a larger-diameter part of the lens body tube 10b, at the center of the member; and the position retaining member 31 is held in the first case split section 26 in such a manner that the position retaining member 31 can rotate in the R direction in FIG. 3. Furthermore, the position retaining member 31 is provided with 4 through-holes 31b that are formed and laid out in the circumferential direction around the center hole 31d. The through-holes 31b are so formed as to have adequate size, with which the through-holes 31b can loosely fit with the 4 protrusion parts 10a2 that protrude from the bottom surface of the lens body tube holder 10a in the direction of the optical axis 11. Moreover, each space between every two through-holes 31b in the circumferential direction is a position retaining part 31a that works as a touching section at which each top part of the 4 protrusion parts 10a2 touches. Furthermore, as shown in FIG. 3B; a drive magnet 31c, which is magnetized with N-pole and S-pole in the circumferential direction, is fixed at a top of a protrusion section that protrudes in the radial direction out of an external wall of the position retaining member 31.

At an outer side position in the radial direction out of the position retaining member 31, the drive coil 37 is located for the purpose of turning the position retaining member 31 in the R direction in relation with the drive magnet 31c. In the drive coil 37, winding 37a is wound around a core 37b, and both ends of the core 37b face the magnetized sections at both ends of the drive magnet 31c each other. Therefore, by energizing the drive coil 37, the position retaining member 31 can be rotated in the R direction without making the center hole 31d contact the larger-diameter part of the lens body tube 10b. Furthermore, it is possible to freely change the rotating direction of the position retaining member 31 by changing the condition of energizing the drive coil 37.

c) Explanation of Shooting Position Change Operation

By referring to FIG. 4, shooting position change operation of the lens drive unit 1 relating to the preferred embodiment 1 of the present invention is described hereunder.

Figure 4A:
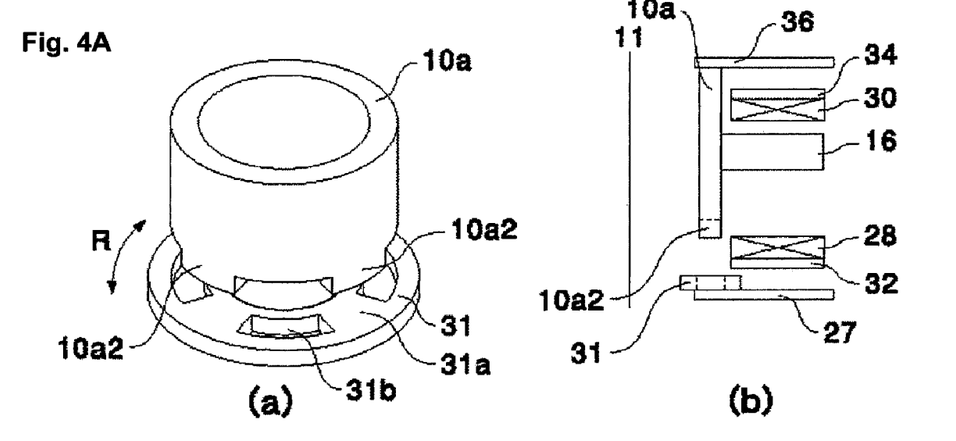
Figure 4B:
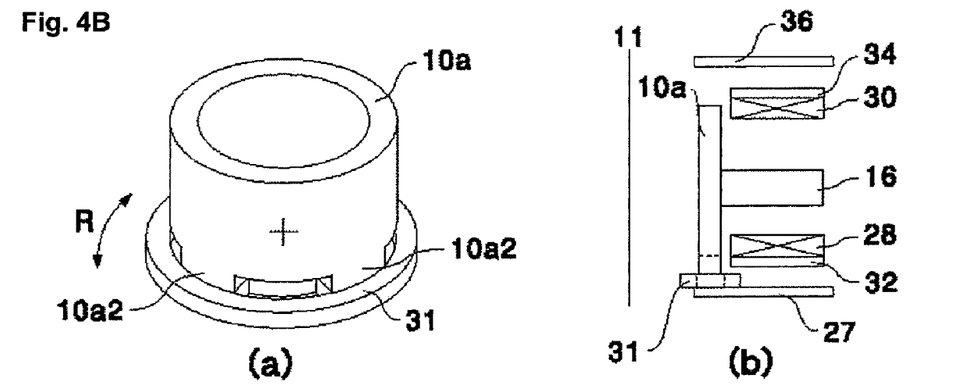
Figure 4C:
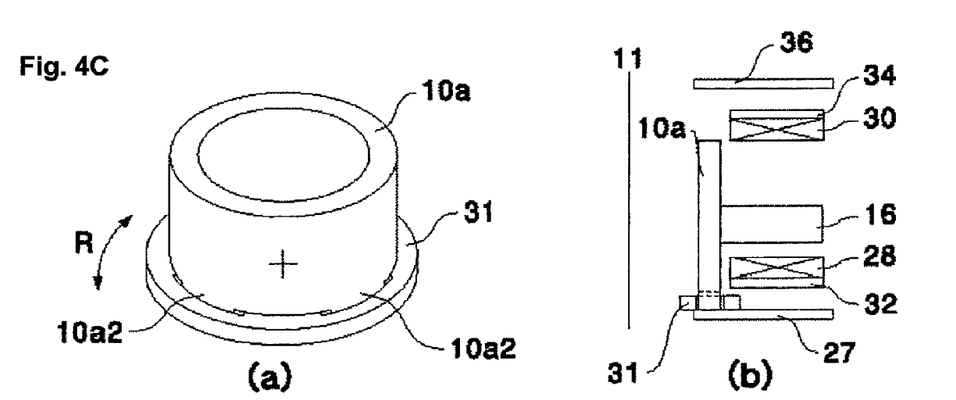

FIG. 4 includes drawings for explanation of position relationships between the lens body tube holder and the position retaining member and so on under the condition where the lens body tube holder is retained at a middle position in the lens drive unit relating to the preferred embodiment 1 of the present invention. The figures of (A) show positioning condition of macro shooting in which the protrusion parts formed at the bottom surface of the lens body tube holder are located away from the position retaining member; wherein the figure (a) and (b) are a perspective view in which the lens body tube holder and the position retaining member are viewed from an obliquely higher position, and a explanatory drawing illustrating the lens body tube holder and the area around the position retaining member, respectively. The figures of (B) show positioning condition of normal-distance shooting in which the protrusion parts formed at the bottom surface of the lens body tube holder touch at the position retaining parts of the position retaining member to retain the lens body tube holder at the middle position; wherein the figure (a) and (b) are a perspective view in which the lens body tube holder and the position retaining member are viewed from an obliquely higher position, and a explanatory drawing illustrating the lens body tube holder and the area around the position retaining member, respectively. Moreover, the figures of (C) show positioning condition of distant view shooting in which the protrusion parts formed at the bottom surface of the lens body tube holder are loosely fitted in the through-holes of the position retaining member and the top parts of the protrusion parts touch at an end section as one of the restriction parts; wherein the figure (a) and (b) are a perspective view in which the lens body tube holder and the position retaining member are viewed from an obliquely higher position, and a explanatory drawing illustrating the lens body tube holder and the area around the position retaining member, respectively.

In the positioning condition of macro shooting shown by FIG. 4A, the upper end surface of the body tube holder 10a touches at the protruded edge 36 that works as the other of the restriction parts, while the 4 protrusion parts 10a2 protruding from the bottom surface of the body tube holder 10a are located away from the position retaining member 31 in the direction of the optical axis 11 by having a certain clearance from the position retaining member 31. Therefore, no matter what condition the position retaining member 31 is stopping in, it is not a problem. In the positioning condition of macro shooting; the drive magnet 16 is close to the second magnetic piece 34, and the upper end surface of the body tube holder 10a touches at the protruded edge 36 under forced condition by magnetic attraction force of the drive magnet 16 and the second magnetic piece 34 even without energizing the first drive coil 28 and the second drive coil 30 so as to enable retaining the position for macro shooting.

To change from this positioning condition to the positioning condition of normal-distance shooting, the drive coil 37 for driving the position retaining member 31 is energized at first before moving the body tube holder 10a downward to rotate the position retaining member 31 in the R direction to have the 4 position retaining parts 31a positioned just under the 4 protrusion parts 10a2. Subsequently, one of the first drive coil 28 and the second drive coil 30 is energized to move the body tube holder 10a downward while resisting the magnetic attraction force of the drive magnet 16 and the second magnetic piece 34. After a short time, as FIG. 4B shows; the top parts of the 4 protrusion parts 10a2 protruding from the bottom surface of the body tube holder touch at the 4 position retaining parts 31a of the position retaining member 31. The positioning condition, in which the top parts of the 4 protrusion parts 10a2 touch at the 4 position retaining parts 31a, results in the middle position; that is to say, the positioning condition of normal-distance shooting. In the positioning condition of normal-distance shooting; the magnet 16 is close to the first magnetic piece 32, and the top parts of the protrusion parts 10a2 touch at the position retaining parts 31a under forced condition even without energizing the first drive coil 28 and the second drive coil 30 so as to enable retaining the position for normal-distance shooting.

Then, to change from this positioning condition of normal-distance shooting to the positioning condition of distant view shooting; the drive coil 37 for driving the position retaining member 31 is energized to rotate the position retaining member 31 in the R direction to have the 4 through-holes 31b positioned just under the 4 protrusion parts 10a2. At the time, since the drive magnet 16 is close to the first magnetic piece 32, all the 4 protrusion parts 10a2 loosely get fitted into the 4 through-holes 31b of the position retaining member 31 even without energizing the first drive coil 28 and the second drive coil 30, so that the body tube holder 10a is able to move downward. As a result, the positioning condition is changed to that of distant view shooting in which the top parts of the protrusion parts 10a2 touch at the end surface 27 as one of the restriction parts. Needless to describe, the first drive coil 28 and/or the second drive coil 30 can be energized, as required. Also, in the positioning condition of distant view shooting; the drive magnet 16 is close to the first magnetic piece 32, and the top parts of the protrusion parts 10a2 touch at the end surface 27 under forced condition even without energizing the first drive coil 28 and the second drive coil 30 so as to enable retaining the position for distant view shooting.

Furthermore, to change from the positioning condition of distant view shooting to the positioning condition of macro shooting; the first drive coil 28 and/or the second drive coil 30 are energized in an opposite manner to the way of moving the body tube holder 10a downward so that the body tube holder 10a is moved upward while resisting the magnetic attraction force of the drive magnet 16 and the first magnetic piece 32.

By the way, to change from the positioning condition of distant view shooting to the positioning condition of normal-distance shooting; directly changing cannot be implemented. That is to say, changing from the positioning condition of distant view shooting to the positioning condition of macro shooting is once implemented, and then changing from the positioning condition of macro shooting to the positioning condition of normal-distance shooting is subsequently implemented by following the procedures described above.

d) Effect of Preferred Embodiment 1

As described above, in the lens drive unit 1 relating to the present embodiment; the 4 position retaining parts 31a are moved by rotating the position retaining member 31, which is held in the case body 24 in such a manner as to become rotatable, in the R direction so that the 4 position retaining parts 31a are positioned just under the 4 protrusion parts 10a2 of the movable lens body 10, and eventually the movable lens body 10 can be retained at the middle position. Furthermore, the 4 through-holes 31b are moved by rotating the position retaining member in the R direction so that the 4 through-holes 31b are positioned just under the 4 protrusion parts 10a2 of the movable lens body 10, and eventually the 4 protrusion parts 10a2 loosely get fitted into the 4 through-holes 31b of the position retaining member 31 to enable the body tube holder 10a to move downward. Therefore, consequently it becomes possible to increase the number of retaining positions of the movable lens body 10 from both the two ends of the entire motion range. Furthermore, at the middle position, the top parts of the 4 protrusion parts 10a2 touch at the 4 position retaining parts 31a to retain the movable lens body 10 so that it is possible to prevent any tilting in relation to the optical axis even though there exists a clearance between the external wall of the upper section of the lens body tube holder 10a and the sliding section 42e.

Moreover, one of the position retaining member 31 and the movable lens body 10 is relatively rotated by using the optical axis 11 as the rotation center so as to move and position the 4 position retaining parts 31a just under the 4 protrusion parts 10a2 of the movable lens body 10 for the purpose of retaining the movable lens body 10 at the middle position. Therefore, it is possible to implement the movement of the 4 position retaining parts 31a by rotating the position retaining member 10 by using the optical axis 11 as the rotation center. Consequently, when being compared with any other protrusion operation to directly move the touching sections in the direction of the optical axis 11 or any other direction intersecting the direction of the optical axis 11, this operation method is able to realize a camera of compact design more easily.

Furthermore, the movable lens body 10 is equipped with the drive magnet 16, and the case body 24 is equipped with a couple of magnet coils; i.e., the drive coil 28 and the drive coil 30; which are positioned while being separated from each other at both the sides of the drive magnet 16 in the direction of the optical axis 11, and in the meantime; the middle position is implemented with the positioning condition in which the drive magnet 16 is close to the drive coil 28, and in the positioning condition of the middle position, the movable lens body 10 touches at the position retaining parts 31a under forced condition by magnetic attraction force of the drive magnet 16 and the first magnetic piece 32 of the magnetic piece 28. Therefore, since it is possible to retain the movable lens body 10 onto the position retaining parts 31a under forced condition, the movable lens body 10 does not get displaced by any physical impact such as a collision and so on so that it is always possible to keep the image quality level stabilized. Furthermore, since it is possible to retain the movable lens body 10 by magnetic attraction force of the drive magnet 16 and the back yoke 31, energy saving can be implemented.

Moreover, while the image shooting positions include three positions; i.e., the normal-distance shooting position for shooting the user's own face, the macro shooting position where shooting can be done at a closer position than the normal-distance shooting position, and the distant view shooting position for shooting scenery and so on; the normal-distance shooting position is located at a middle position. The middle position is closer to the side of the distant view shooting position for shooting scenery and so on than to the macro shooting position where close-up shooting can be done. Therefore, the position retaining member 31 is located at the side of the image pickup device 44 that is at the side of the distant view shooting position, and eventually at the middle position, the drive magnet 16 is able to have the movable lens body 10 touch at the position retaining parts 31a under forced condition by magnetic attraction force that is caused by working together with the back yoke 32 of the magnetic piece 28.

Furthermore, since the position retaining parts 31a retain the movable lens body 10 at the middle position by touching at the top parts of the 4 protrusion parts 10a2 formed at the end surface of the movable lens body 10 in the direction of the optical axis, the position retaining parts 31a are placed so as to face the top parts of the 4 protrusion parts 10a2. Therefore, it becomes possible to restrict and control the protruding amount of the position retaining parts 31a toward the external side of the movable lens body 10 so that the camera can be downsized in the direction perpendicular to the optical axis 11.

Still further, by moving the position retaining member 31, the position retaining parts 31a are advanced so as to touch at the top parts of the 4 protrusion parts 10a2 formed at the end surface of the movable lens body 10 and retain the movable lens body 10 at the middle position; and therefore it becomes possible to advance the position retaining parts 31a so as to have the position retaining parts 31a touch at the movable lens body 10 without moving the movable lens body 10 so that displacement of the optical axis of the lens 14 can be avoided.

e) Modification of Preferred Embodiment 1

Figure 5:
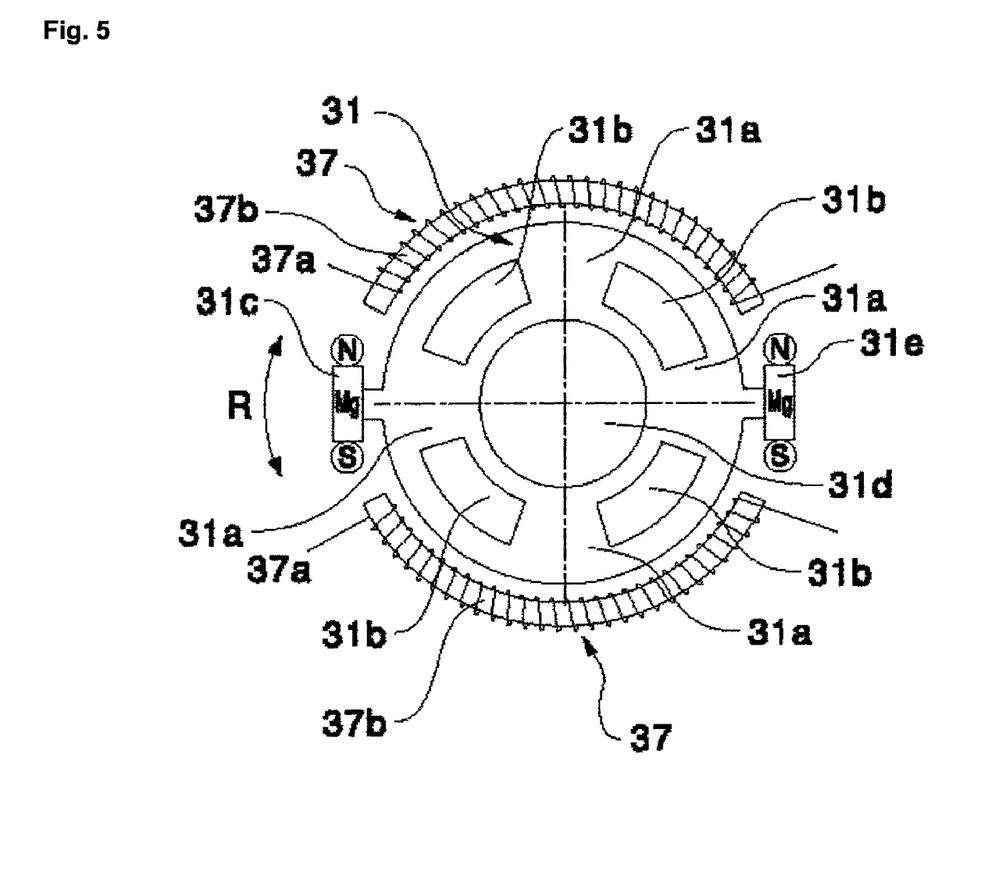
FIG. 5 is a plan view drawing that shows a modification where the position retaining member and the drive coil to drive the position retaining member are partially modified in the lens dive unit relating to the preferred embodiment 1 of the present invention.

FIG. 5 is a plan view drawing that shows a modification where the position retaining member and the drive coil to drive the position retaining member are partially modified in the lens dive unit relating to the preferred embodiment 1 of the present invention.

That is to say, in the preferred embodiment 1 described above, the magnet 31c, which is magnetized with N-pole and S-pole in the circumferential direction, is fixed at the tip of one protrusion part that externally protrudes in the radial direction from the external wall of the position retaining member 31, as shown in FIG. 3B. However, it is still possible to form another protrusion part at a position that is symmetric with the former protrusion part with respect to the point, as FIG. 5 shows, and a magnet 31e is also fixed at the tip of the later protrusion part. In this case, the magnetizing directions of the magnet 31c and magnet 31e are opposite to each other in the circumferential direction. Furthermore, the drive coil 37 is split into a couple of pieces at a position corresponding to the drive magnet 31e. Therefore, when the couple of drive coils 37 are energized in such a manner that the end surfaces of the couple of cores 37b sandwiching the magnet 31c and facing each other are magnetized so as to have the same pole, the position retaining member 31 can be moved in the R direction. In this preferred embodiment, it is still possible to configure in such a manner that only one of the couple of drive coils 37 is energized.

Figure 6A:
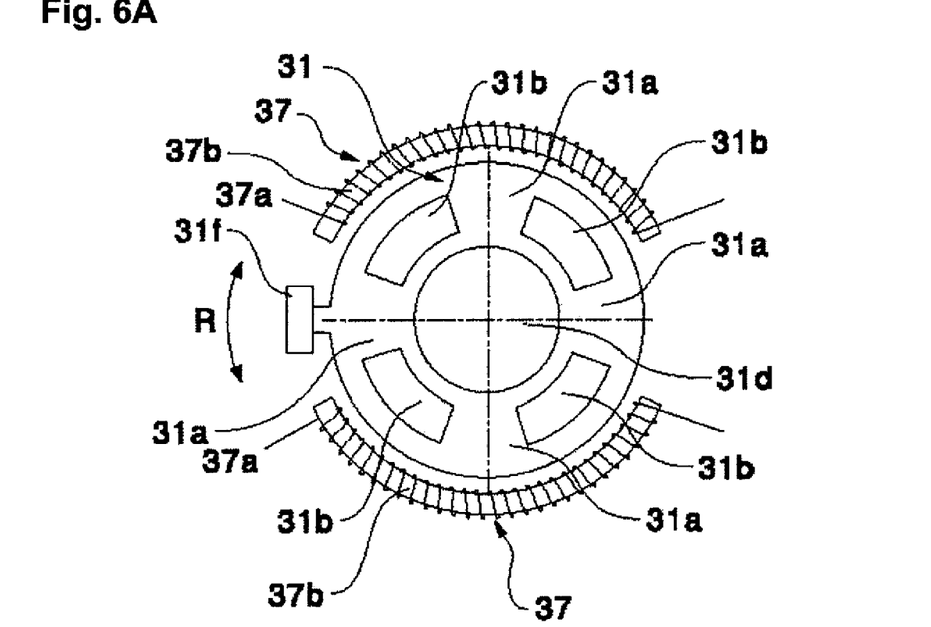
FIGS. 6A and 6B are plan view drawings that individually show other modifications where the position retaining member and the drive coil to drive the position retaining member are partially modified in the lens dive unit relating to the preferred embodiment 1 of the present invention.
Figure 6B:
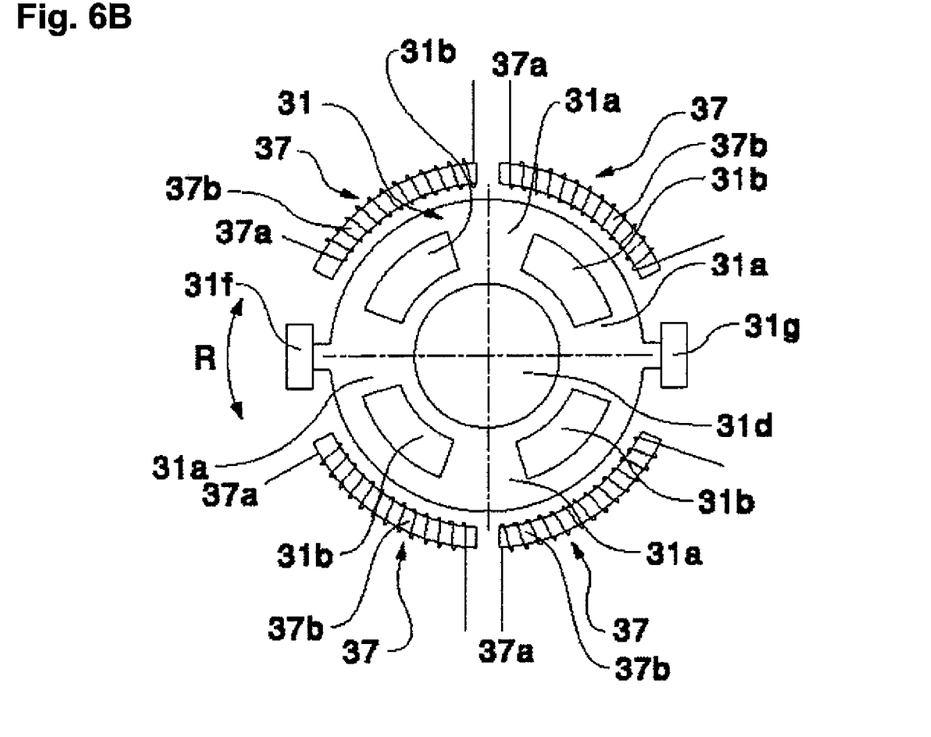

Furthermore, FIGS. 6A and 6B are plan view drawings that individually show other modifications where the position retaining member and the drive coil to drive the position retaining member are partially modified in the lens dive unit relating to the preferred embodiment 1 of the present invention.

That is to say, it is also possible to configure in such a manner that, as shown in FIG. 6A, a magnet piece 31f is fixed instead of the magnet 31c in the preferred embodiment shown in FIG. 5, and the magnet 31e is removed. In this preferred embodiment, it is simply utilized that the magnet piece 31f is magnetically attracted to the core 37b when the drive coil 37 is energized. Therefore, if the couple of drive coils 37 are energized at the same time, the magnetic attraction forces imposed onto the magnet piece 31f conflict each other. Eventually, only one of the winding coil 37a is energized.

Furthermore, it is also possible to configure in such a manner that, as shown in FIG. 6B, the magnet piece 31f and a magnet piece 31g are fixed instead of the magnet 31c and the magnet 31e in the preferred embodiment shown in FIG. 5. In this preferred embodiment, it is required to further split the couple of drive coils 37 shown in FIG. 6A into two pieces each so as to eventually configure with two couples. That is to say, in FIG. 6B, the drive coil 37 at the upper left position and the drive coil 37 at the lower right position configure one couple of drive coils, while the drive coil 37 at the lower left position and the drive coil 37 at the upper right position configure the other couple of drive coils. When only either couple; out of one and the other couples of coils; is energized, the position retaining member 31 can be moved in the R direction. Furthermore, in this preferred embodiment, it is possible to energize both the two drive coils 37 of either couple of drive coils at the same time, or to energize only one of the two drive coils 37 of either couple of drive coils.

FIG. 7 includes perspective view drawings, viewing from an obliquely higher position, each of which shows a modification where the position retaining member is partially modified in the lens dive unit relating to the preferred embodiment 1 of the present invention.

Figure 7A:
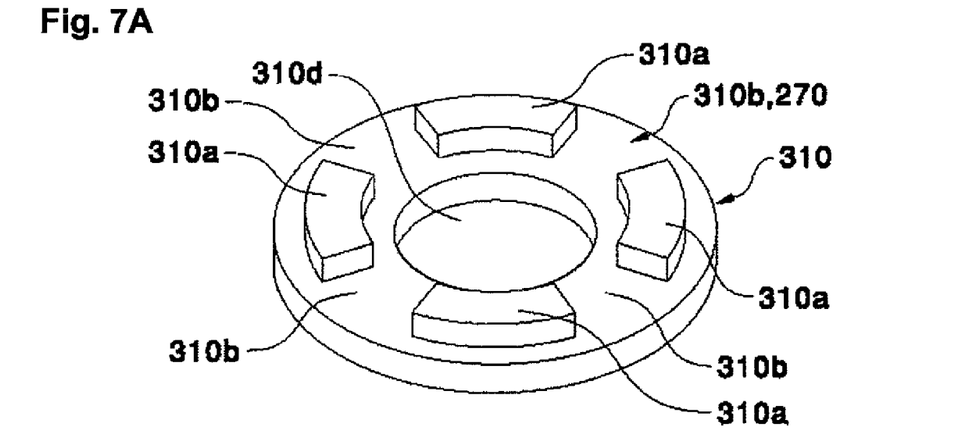
FIG. 7 includes perspective view drawings, viewing from an obliquely higher position, each of which shows a modification where the position retaining member is partially modified in the lens dive unit relating to the preferred embodiment 1 of the present invention.

In the position retaining member 31 of the preferred embodiment 1, the through-holes 31b are formed around the center hole 31d. However, it is also possible as shown in FIG. 7A to form 4 protrusion parts 310a on a surface of the position retaining member 31, which is shaped like a disc, as position retaining parts; and to form clearance parts 310b between each two protrusion parts 310a in the circumferential direction to have the protrusion parts 10a2 loosely fitted. That is to say, when the protrusion parts 10a2 loosely gets fitted into the clearance parts 310b, the top parts of the protrusion parts 10a2 touch at a surface section 270 of the position retaining member 31. Consequently, the surface section 270 of the position retaining member 31 corresponds to the other of the restriction parts, which is the position of distant view shooting.

Figure 7B:
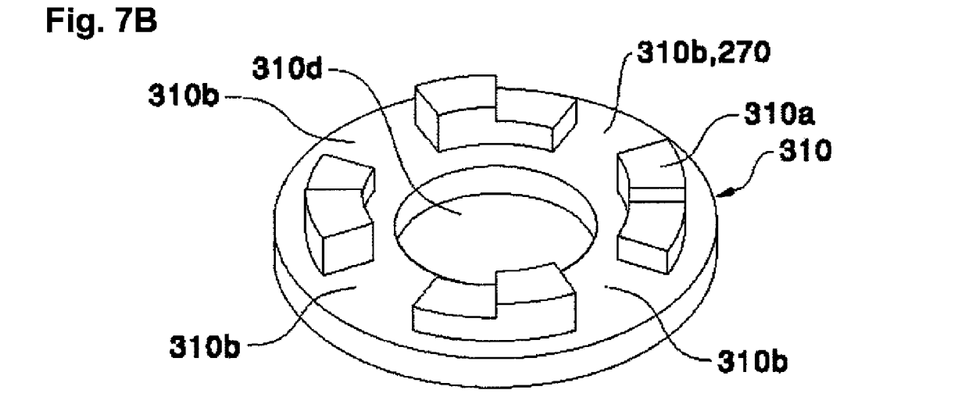
Figure 7C:
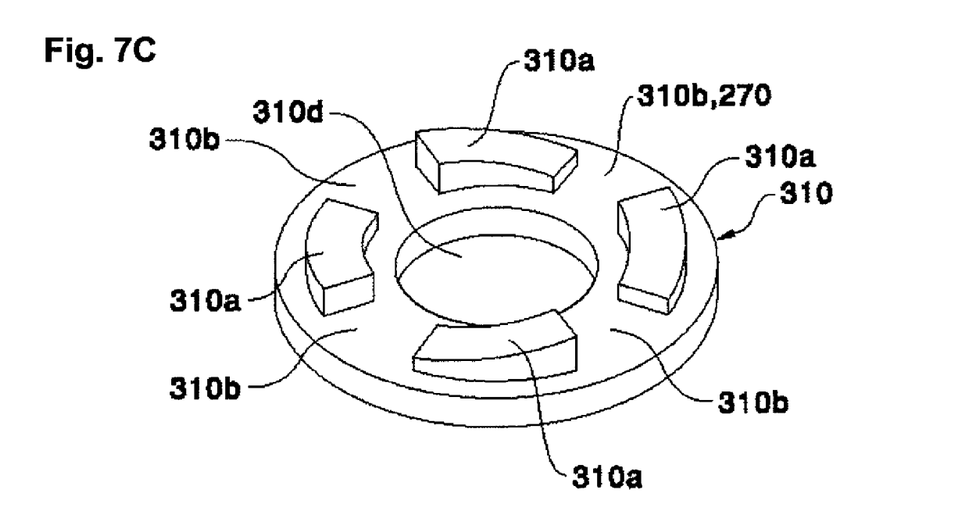

Furthermore, it is also possible that each of the protrusion parts 310a shown in FIG. 7A is formed as a two-step stair with different elevations in the direction of the optical axis 11, as shown in FIG. 7B. According to this structure, the movable lens body 10 can be positioned and retained at two of middle positions. Moreover, the number of steps can be two or more as well. Still further, it is also possible to make the elevation of the top parts continuously changed in the direction of the optical axis 11 so as to form the tapered top parts as shown in FIG. 7C. According to this structure, the movable lens body 10 can be positioned and retained at any middle position in a stepless manner. Incidentally, it is not necessarily required to drive the position retaining member 31 by using the drive magnet 31c and the drive coil 37. Namely; it is also possible to configure in such a manner that a protrusion part protruding from the external wall of the position retaining member 31 is handled manually so as to turn the position retaining member 31.

a) Preferred Embodiment 2

Next, a lens drive unit relating to the preferred embodiment 2 of the present invention is described. In the preferred embodiment 1 described above, the unit is structured in such a manner that the position retaining member 31 rotates without turning the lens body tube holder 10a. However, in the preferred embodiment 2, the unit is structured in such a manner opposite to the way of the preferred embodiment 1 that the lens body tube holder 10a rotates while the position retaining member 31 being fixed. Incidentally, as far as essential conditions such as driving operations of the movable lens body 10 and so on are concerned, the conditions are the same as those of the preferred embodiment 1. Therefore, parts having the same functions as those of the preferred embodiment 1 are provided with the same symbols as given in the preferred embodiment 1, and detailed explanations for the conditions common to the two embodiments are omitted.

Figure 8:
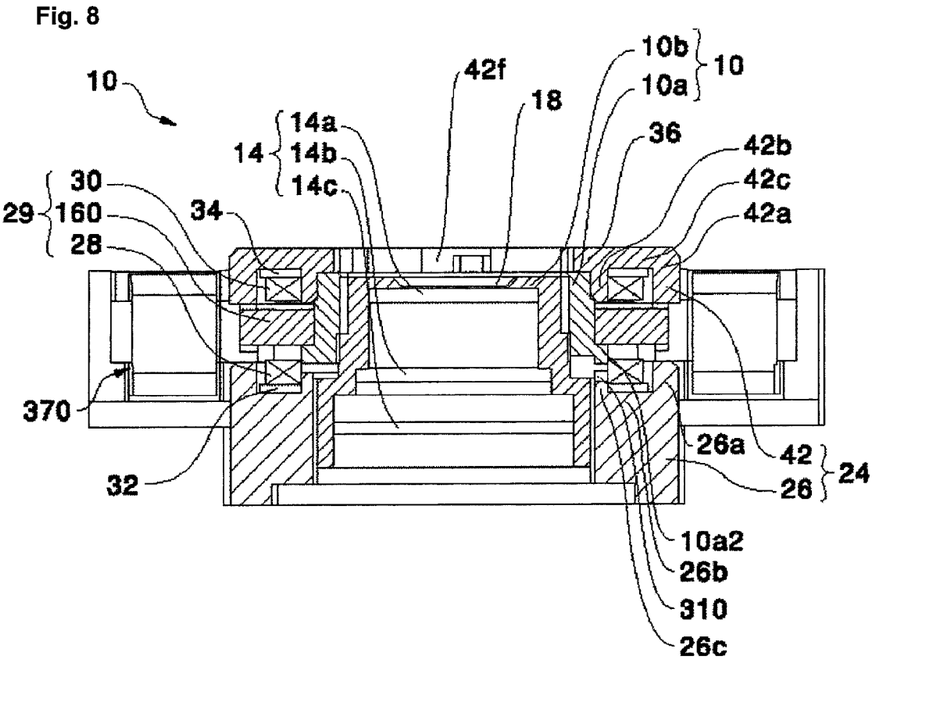
FIG. 8 shows a cross sectional drawing of a lens drive unit relating to the preferred embodiment 2 of the present invention.
Figure 9:
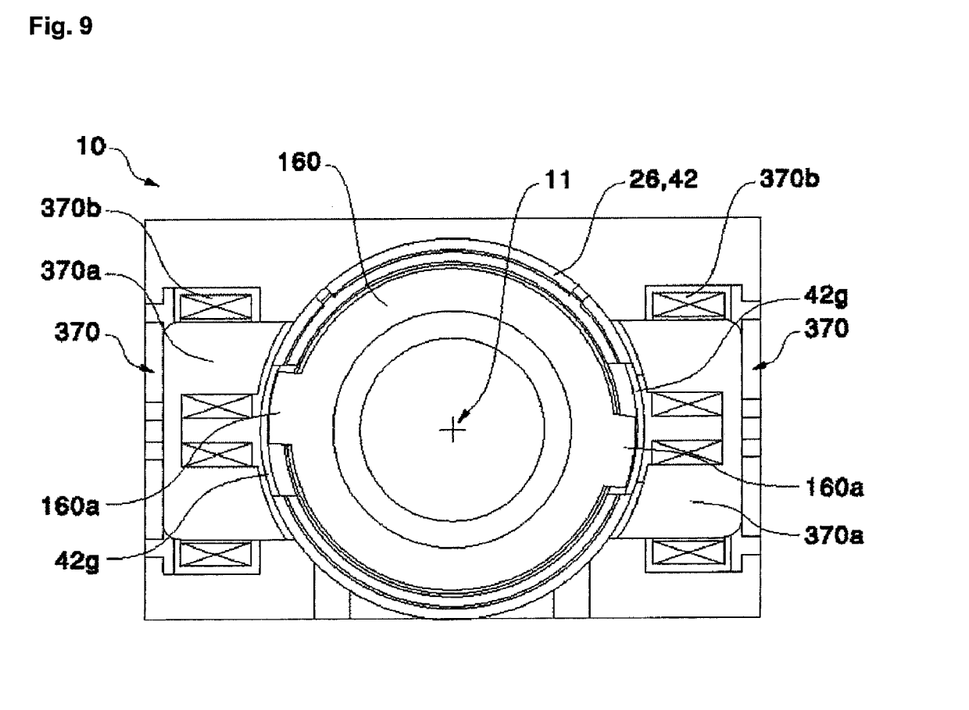
FIG. 9 is a plan view drawing to illustrate the lens drive unit shown in FIG. 8.
Figure 10A:
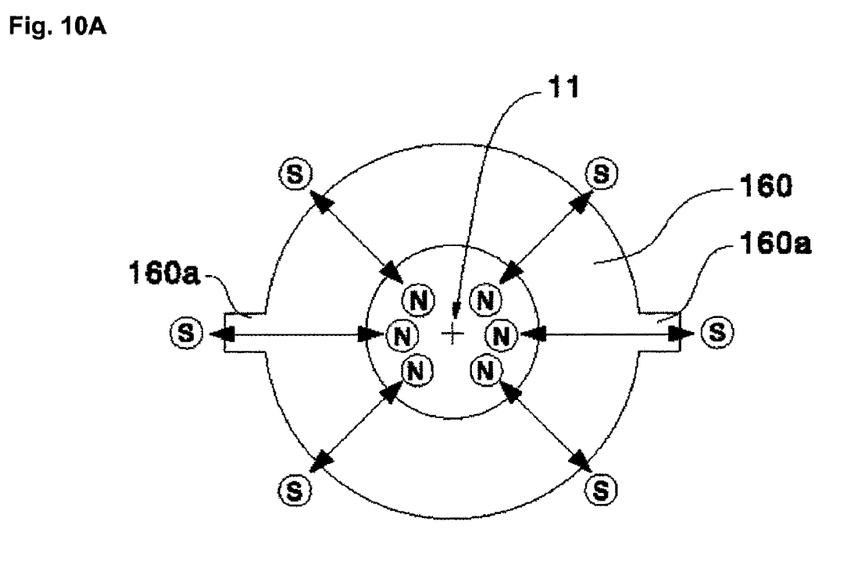
FIGS. 10A and 10B are plan view drawings of a drive magnet and a plan view drawing to illustrate the drive magnet and a drive coil for driving a lens body tube holder, respectively, wherein the drive magnet and the drive coil are used in the lens drive unit shown in FIG. 8.
Figure 10B:
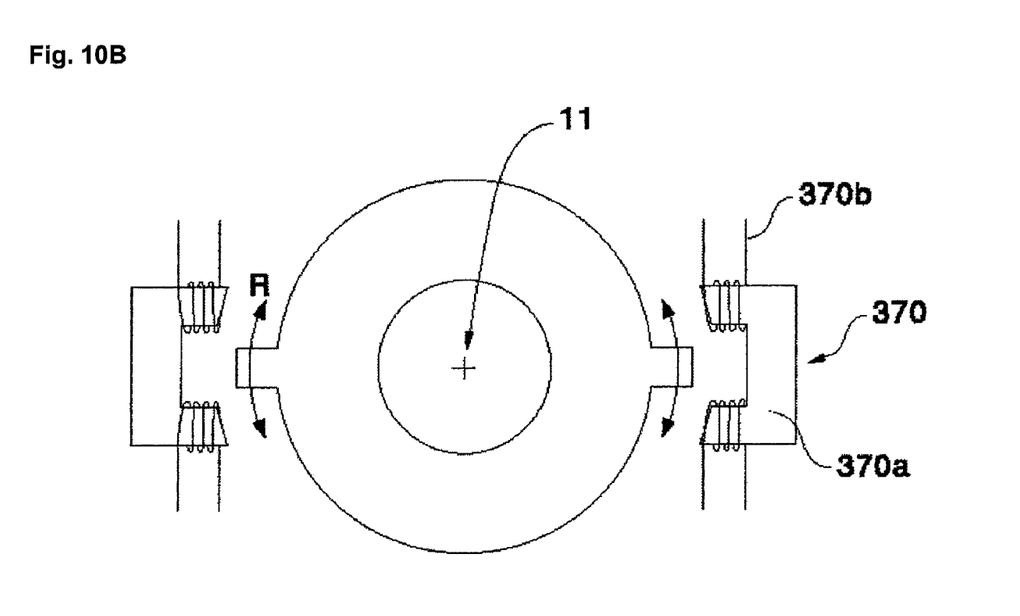

FIG. 8 shows a cross sectional drawing of a lens drive unit relating to the preferred embodiment 2 of the present invention. Meanwhile, FIG. 9 is a plan view drawing to illustrate the lens drive unit shown in FIG. 8. FIGS. 10A and 10B are a plan view drawing of a drive magnet and a plan view drawing to illustrate the drive magnet and a drive coil for driving a lens body tube holder, respectively, wherein the drive magnet and the drive coil are used in the lens drive unit shown in FIG. 8.

FIG. 8 shows a positioning condition of macro shooting in which an upper end surface of the body tube holder 10a touches at the protruded edge 36 that works as the other of the restriction parts. In this preferred embodiment; from the bottom surface of the lens body tube holder 10a, 4 protrusion parts 10a2 that protrude in the direction of the optical axis 11 are also formed in the circumferential direction, in the same manner as formed in the preferred embodiment 1. Furthermore, the position retaining member 31 has the same structure as given in the preferred embodiment 1, as far as the essential configuration is concerned. Namely, the position retaining member 31 is formed to be like a disc equipped with a center hole 31d, which loosely fits with a larger-diameter part of the lens body tube 10b, at the center of the member; and the position retaining member 31 is provided with 4 through-holes 31b that are formed and laid out in the circumferential direction around the center hole 31d. The size of the through-holes 31d is made in such a manner that the through-holes can loosely be fitted with the 4 protrusion parts 10a2, and each space between every two through-holes 31b in the circumferential direction is the position retaining part 31a. However, the position retaining member 31 in this preferred embodiment is fixed to the side of an upper internal wall of the first case split section 26 so as not to rotate in the R direction.

As FIG. 9 shows, a drive magnet 160 is equipped with protrusion parts 160a that are formed so as to protrude from an external circumference of the drive magnet 160. The protrusion parts 160a are placed at two positions that are symmetrical each other about a point of the optical axis 11. In the meantime, at a connection part of the first case split section 26 and the second case split section 42; two parts facing the couple of protrusion parts 160a are notched so as to form a couple of notched parts 42g through which the couple of protrusion parts 160a are exposed externally. Furthermore, at an external section of the case body 24, a couple of magnetic coils 370 to be described later are placed so as to face the couple of protrusion parts 160a.

In the case of the preferred embodiment 1 described above, the lens body tube holder 10a is provided with the turning-prevention part that is formed so as to be protruded from the top surface of the lens body tube holder 10a, though the turning-prevention part is not illustrated in the figure. Then, the turning-prevention part is engaged with a turning-prevention groove 42d placed in a second case split section 42, which is described later, to prevent turning motion. However, in the lens body tube holder 10a of the present preferred embodiment, such a turning-prevention part is not formed so that the lens body tube holder 10a is supported by the case body 24 in such a manner that the lens body tube holder 10a is able to rotate. Therefore, the couple of notched parts 42g are so notched as to be sized to cover a range in which the couple of protrusion parts 160a rotate.

Furthermore, in each of the drive coils 370; winding 370b is wound at a couple of facing parts, which face each other, of a U-shaped core 370a made of a magnetic material as shown in FIG. 9. Meanwhile, the drive magnet 160 is magnetized with N-pole and S-pole in the radial direction, as shown in FIG. 10A, and the couple of protrusion parts 160a are magnetized with S-pole. As a result, by energizing the couple of drive coils 370, a magnetic effect works on the couple of protrusion parts 160a as shown in FIG. 10B so as to turn the lens body tube holder 10a in the R direction.

Incidentally, it is also possible that the couple of protrusion parts 160a are magnetized with N-pole and only one of the couple of drive coils 370 is magnetized. Furthermore, though the couple of protrusion parts 160a are placed at two positions that are symmetrical each other about a point of the optical axis 11, it is not necessarily required to place the two positions to be symmetrical each other about the point. Needless to describe, it is also possible to form the protrusion parts 160a at two or more positions or even at only one position.

In the present preferred embodiment, a position retaining member 31 is fixed to the side of the upper internal wall of the first case split section so as not to rotate; but on the other hand, the lens body tube holder 10a rotates instead. Thus, between the present preferred embodiment and the preferred embodiment 1, the only difference is a condition whether the position retaining member 31 or the lens body tube holder 10a functions as a rotating main element. Therefore, operations for changing a shooting position can be implemented in the same manner as done in the preferred embodiment 1. That is to say, in the case of the present preferred embodiment, the lens body tube holder 10a rotates so as to have the 4 protrusion parts 10a2 positioned just above one of the groups of the 4 position retaining parts 31a and the 4 through-holes 31b, and then the lens body tube holder 10a moves downwards to enable changing the shooting position between the shooting positions for normal-distance shooting and distant view shooting.

b) Effect of Preferred Embodiment 2

In the present preferred embodiment, by rotating the movable lens body 10, the 4 protrusion parts 10a2 get moved relatively so as to make it possible to touch at the 4 position lens body tube holder 10a in order to retain the movable lens body 10 at a middle position. Therefore, the drive magnet 160 to move the movable lens body 10 in the direction of the optical axis 11 also works as a driving device to rotate the position retaining member 31a in the R direction, so that it becomes possible to advance the position retaining parts 31a so as to enable touching at the 4 protrusion parts 10a2.

c) Modification of Preferred Embodiment 2

Figure 11A:
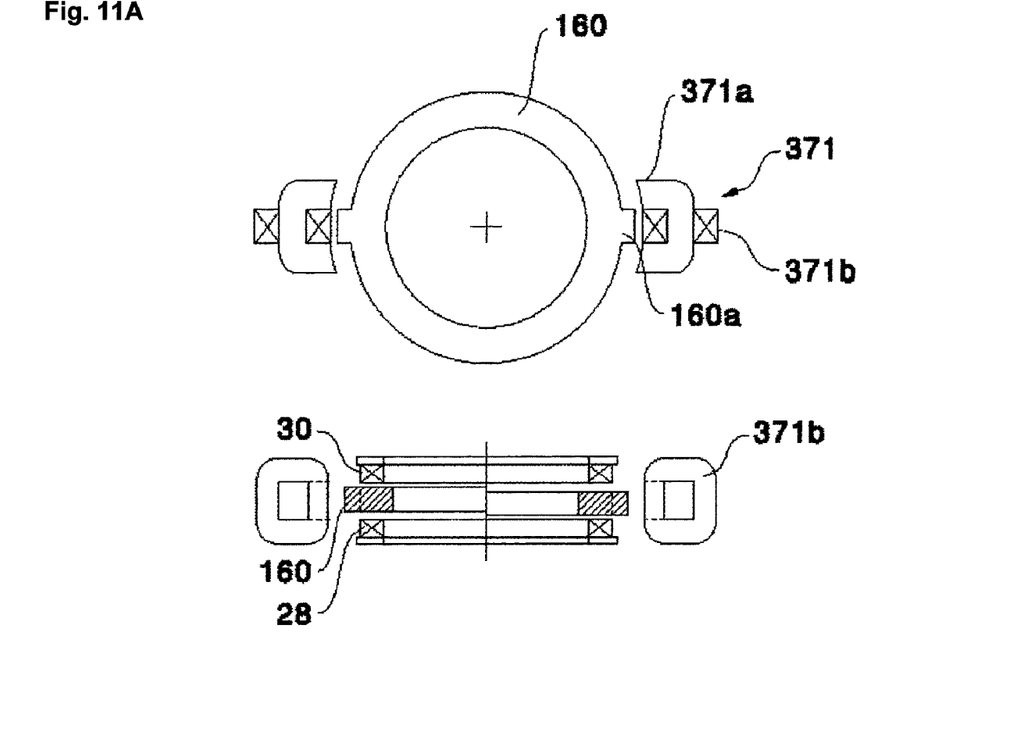
FIGS. 11A and 11B individually show a plan view drawing and a sectional drawing of each modification where the magnet and the drive coil to drive the lens body tube holder are partially modified in the lens drive unit relating to the preferred embodiment 2 of the present invention.
Figure 11B:
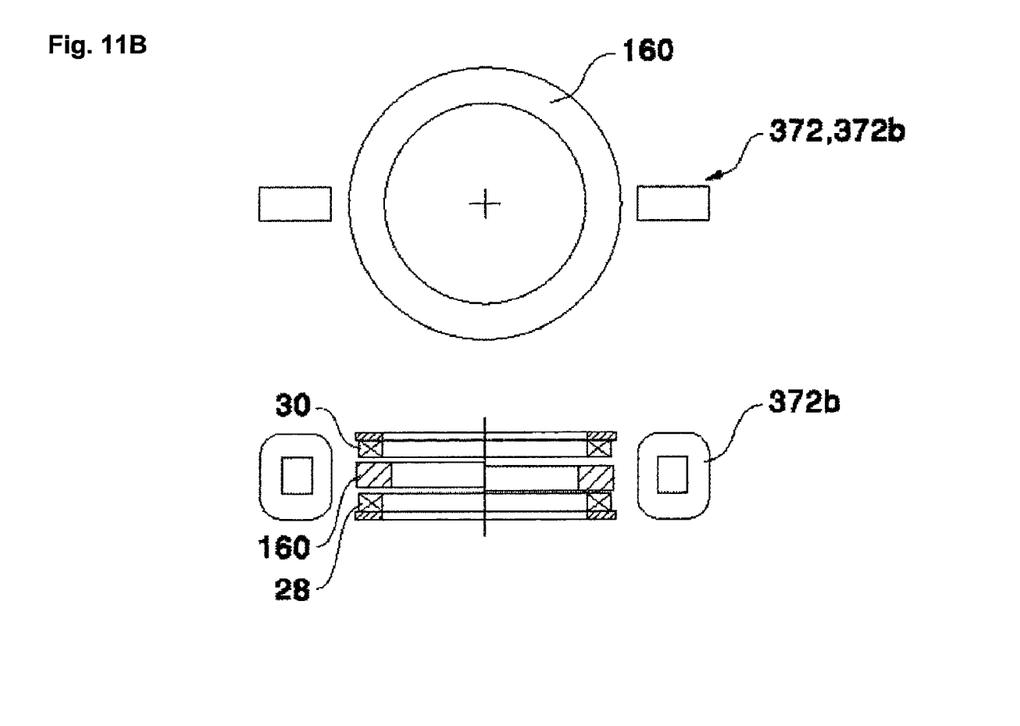

Incidentally, FIGS. 11A and 11B individually show a plan view drawing and a sectional drawing of each modification where the magnet and the drive coil to drive the lens body tube holder are partially modified in the lens drive unit relating to the preferred embodiment 2 of the present invention.

In each of the drive coils 370 of the preferred embodiment 2 described above, the winding 370b is wound at the couple of facing parts, which face each other, of the U-shaped core 370a made of the magnetic material. However, as a drive coil 371 shows in FIG. 11A; it is also possible to configure the drive coil 371 by placement of winding 371b onto a junction part that connects a couple of facing parts, which face each other, of a U-shaped core 371a.

Furthermore, as FIG. 11B shows; it is also possible to configure a drive coil 372 by using only winding 372b while removing the core 371a out of the drive coil 371 of FIG. 11A. In this case, the protrusion parts 160a of the drive magnet 160 shown in FIG. 11A are not required.

Meanwhile, it is also possible to configure drive coils by using a plurality of drive coils in combination, such as the drive coil 370, the drive coil 371, the drive coil 372, and so on. Furthermore, it is not necessarily required to drive the lens body tube holder 10a by using these drive coils, such as the drive coil 370, the drive coil 371, the drive coil 372, and so on. That is to say, it is also possible to configure in such a manner that one of the protrusion parts 160a of the drive magnet is handled manually so as to turn the lens body tube holder 10a.

Moreover, the image pickup device 44 of the present preferred embodiment is configured with a CMOS (Complementary Metal Oxide Semiconductor), but a CCD, a VMIS, and so forth can also be adopted instead of the CMOS. Furthermore, though the lens drive unit 1 is built in as a camera section mechanism of a camera-equipped cell-phone; the lens drive unit can also be used for other mobile equipment, such as a mobile computer, a PDA, and so on; and the lens drive unit can also be built in other camera equipment, such as a surveillance camera, a camera for medical use, and so forth, and an automobile, as well as electronic equipment such as a TV set and so on.

INDUSTRIAL APPLICABILITY

The present invention can be applied in a camera device, and it can also be adopted for mobile equipment, such as a cell-phone, etc. equipped with a camera. Furthermore, it is possible to build a mechanism of the present invention into all kinds of electronic equipment, as far as the equipment is equipped with a lens position change mechanism.

While the foregoing description and drawings represent the present invention, it will be obvious to those skilled in the art that various changes may be made therein without departing from the true spirit and scope of the present invention.

REFERENCE NUMERALS 1. lens drive unit
10. movable lens body
11. optical axis
14. lens
16. drive magnet (first magnetic means)
24. case body (fixing body)
26. first case split section (half of case body)
27. end surface (one of the restriction parts, i.e., end section)

29. magnetic drive means (drive means)
28. first drive coil (second magnetic means)
30. second drive coil (second magnetic means)
31. position retaining member
31a. position retaining part (touching section)
32. first magnetic piece (back yoke)
34. second magnetic piece (back yoke)
36. protruded edge (the other of restriction parts, i.e., end section)
42. second case split section (half of case body)
44. image pickup device
45. circuit board

What is claimed is:

1. A lens drive unit comprising:
a movable lens body equipped with a lens;
drive means for moving the movable lens body in an optical axis direction of the lens;
a fixing body to support the movable lens body in such a manner to enable the movable lens body to move in the optical axis direction; and
means retaining a position of the movable lens body at both ends of an entire motion range in the optical axis direction;
said movable lens body being equipped with a first magnetic means as said drive means;
said fixing body being equipped with a second magnetic means as said drive means which is placed so as to enable the movable lens body to move by one of magnetic attraction force and magnetic repulsion force caused between the first magnetic means and the second magnetic means; and
said fixing body being equipped with a position retaining member to retain the movable lens body at a middle position of the entire motion range in the optical axis direction while a touching section for touching at the movable lens body is touching at the movable lens body; and
one of the position retaining member and the movable lens body relatively moves so as to move the touching section so as to have the touching section touch at the movable lens body to retain the movable lens body at the middle position so that the number of retaining positions of the movable lens body increase from the two ends of the entire motion range.

2. The lens drive unit according to claim 1:
wherein one of the position retaining member and the movable lens body rotates relatively by using the optical axis as a rotating center so as to move the touching section so as to have the touching section touch at the movable lens body to retain the movable lens body at the middle position.

3. The lens drive unit according to claim 2:
wherein the touching section is formed in a plural number in a circumferential direction.

4. The lens drive unit according to claim 2:
wherein the first magnetic means is formed by one of a drive magnet and a drive coil;
said second magnetic means is formed by the other side elements of a couple of drive magnets and a couple of drive coils which are placed separately at both sides of the first magnetic means in the optical axis direction;
the middle position is formed under a positioning condition in which the first magnetic means is in proximity to the second magnetic means; and
at the middle position, the movable lens body is touched to the touching section under forced condition, by magnetic attraction force between the drive magnet and a back yoke of the drive coil.

5. The lens drive unit according to claim 4:
wherein the position retaining member is located at a side of an image pickup device.

6. The lens drive unit according to claim 1:
wherein the touching section retains the movable lens body at the middle position by touching at an end surface in the optical axis direction of the movable lens body.

7. The lens drive unit according to claim 1:
wherein the position retaining member gets moved so as to move the touching section for having the touching section touch at the movable lens body to retain the movable lens body at the middle position.

8. The lens drive unit according to claim 1:
wherein the movable lens body gets moved so as to move the touching section for having the touching section touch at the movable lens body to retain the movable lens body at the middle position.

* * * * *